United States Patent
Miller et al.

(10) Patent No.: US 10,137,981 B2
(45) Date of Patent: Nov. 27, 2018

(54) ELECTRIC PROPULSION SYSTEM FOR AN AIRCRAFT

(71) Applicant: General Electric Company, Schenectady, NY (US)

(72) Inventors: Brandon Wayne Miller, Liberty Township, OH (US); Randy M. Vondrell, Cincinnati, OH (US); Patrick Michael Marrinan, Mason, OH (US); Paul Robert Gemin, Cincinnati, OH (US); Nicholas Taylor Moore, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 36 days.

(21) Appl. No.: 15/475,401

(22) Filed: Mar. 31, 2017

(65) Prior Publication Data
US 2018/0281931 A1    Oct. 4, 2018

(51) Int. Cl.
  B64C 21/06    (2006.01)
  B64D 27/18    (2006.01)
  (Continued)

(52) U.S. Cl.
  CPC .............. B64C 21/06 (2013.01); B64D 27/18 (2013.01); B64D 27/24 (2013.01);
  (Continued)

(58) Field of Classification Search
  CPC .......... B64C 21/06; B64D 27/18; B64D 27/24
  See application file for complete search history.

(56) References Cited

U.S. PATENT DOCUMENTS

| | | |
|---|---|---|
| 2,812,912 A | 11/1957 | Stevens et al. |
| 3,286,470 A | 11/1966 | Gerlaugh |
| (Continued) | | |

FOREIGN PATENT DOCUMENTS

| | | |
|---|---|---|
| EP | 3144217 A1 | 3/2017 |
| GB | 2489311 A | 9/2012 |
| (Continued) | | |

OTHER PUBLICATIONS http://aviationweek.com/awin/boeing-researches-alternative-propulsion-and-fuel-options, Aviation Week & Space Technology, Jun. 4, 2012.
(Continued)

*Primary Examiner* — Viet Nguyen
(74) *Attorney, Agent, or Firm* — General Electric Company; Pamela Kachur

(57) ABSTRACT

An aeronautical propulsion system includes a fan having a plurality of fan blades rotatable about a central axis and defining a fan pressure ratio, FPR. The propulsion system also includes an electric motor mechanically coupled to the fan for driving the fan, the electric motor including a number of poles, $n_{poles}$, and defining a maximum power, P. The relationship between the fan pressure ratio, FPR, of the fan, the number of poles, $n_{poles}$, of the electric motor, and the maximum power, P, of the electric motor is defined by an equation:

$$\frac{n_{pole}}{\sqrt{P}} = C_1 \cdot e^{-9.062 \cdot FPR} + C_2 \cdot e^{-1.2604 \cdot FPR};$$

wherein $C_1$ is a constant having a value between 22,000 and 52,000, wherein $C_2$ is a constant having a value between 4.0 and 9.8, and wherein e is Euler's number.

20 Claims, 7 Drawing Sheets

(51) Int. Cl.
*B64D 27/24* (2006.01)
*B64D 27/02* (2006.01)

(52) U.S. Cl.
CPC .... *B64C 2230/04* (2013.01); *B64D 2027/026* (2013.01); *B64D 2221/00* (2013.01)

(56) References Cited

U.S. PATENT DOCUMENTS

| | | |
|---|---|---|
| 3,312,448 A | 4/1967 | Hull, Jr. et al. |
| 3,844,110 A | 10/1974 | Widlansky et al. |
| 4,089,493 A | 5/1978 | Paulson |
| 4,605,185 A | 8/1986 | Reyes |
| 4,913,380 A | 4/1990 | Verdaman et al. |
| 5,757,100 A | 5/1998 | Burgbacher |
| 5,927,644 A | 7/1999 | Ellis et al. |
| 6,976,655 B2 | 12/2005 | Thompson |
| 6,982,533 B2 | 1/2006 | Seibel et al. |
| 7,267,300 B2 | 9/2007 | Heath et al. |
| 7,387,189 B2 | 6/2008 | James et al. |
| 7,423,394 B2 | 9/2008 | Collins |
| 7,493,754 B2 | 2/2009 | Moniz et al. |
| 7,622,817 B2 | 11/2009 | El-Refaie et al. |
| 7,665,689 B2 | 2/2010 | McComb |
| 7,752,834 B2 | 7/2010 | Addis |
| 7,806,363 B2 | 10/2010 | Udall et al. |
| 7,819,358 B2 | 10/2010 | Belleville |
| 7,905,449 B2 | 3/2011 | Cazals et al. |
| 7,976,273 B2 | 7/2011 | Suciu et al. |
| 8,033,094 B2 | 10/2011 | Suciu et al. |
| 8,099,944 B2 | 1/2012 | Foster et al. |
| 8,109,073 B2 | 2/2012 | Foster et al. |
| 8,128,019 B2 | 3/2012 | Annati et al. |
| 8,162,254 B2 | 4/2012 | Roche |
| 8,220,739 B2 | 7/2012 | Cazals |
| 8,226,040 B2 | 7/2012 | Neto |
| 8,291,716 B2 | 10/2012 | Foster et al. |
| 8,294,409 B2 | 10/2012 | Said et al. |
| 8,317,126 B2 | 11/2012 | Harris et al. |
| 8,469,306 B2 | 6/2013 | Kuhn, Jr. |
| 8,492,920 B2 | 7/2013 | Huang et al. |
| 8,549,833 B2 | 10/2013 | Hyde et al. |
| 8,552,575 B2 | 10/2013 | Teets et al. |
| 8,596,036 B2 | 12/2013 | Hyde et al. |
| 8,622,687 B2* | 1/2014 | Giffin ................ F02K 3/075 415/1 |
| 8,640,439 B2 | 2/2014 | Hoffjann et al. |
| 8,672,263 B2 | 3/2014 | Stolte |
| 8,684,304 B2 | 4/2014 | Burns et al. |
| 8,723,349 B2 | 5/2014 | Huang et al. |
| 8,723,385 B2 | 5/2014 | Jia et al. |
| 8,857,191 B2 | 10/2014 | Hyde et al. |
| 8,890,343 B2 | 11/2014 | Bulin et al. |
| 8,939,399 B2 | 1/2015 | Kouros et al. |
| 8,998,580 B2 | 4/2015 | Quiroz-Hernandez |
| 9,038,398 B2 | 5/2015 | Suciu et al. |
| 9,162,669 B2 | 10/2015 | Dziuba et al. |
| 10,000,293 B2* | 6/2018 | Hamel ................ B64D 27/18 |

| | | |
|---|---|---|
| 2008/0141655 A1* | 6/2008 | Johnson ................ F02K 1/82 60/226.3 |
| 2008/0155961 A1* | 7/2008 | Johnson ................ F02K 3/06 60/226.3 |
| 2010/0038473 A1 | 2/2010 | Schneider et al. |
| 2010/0207478 A1* | 8/2010 | Dev ................ H02K 7/14 310/156.34 |
| 2012/0119020 A1 | 5/2012 | Burns et al. |
| 2012/0153076 A1 | 6/2012 | Burns et al. |
| 2012/0209456 A1 | 8/2012 | Harmon et al. |
| 2013/0032215 A1 | 2/2013 | Streifinger |
| 2013/0036730 A1 | 2/2013 | Bruno et al. |
| 2013/0052005 A1 | 2/2013 | Cloft |
| 2013/0062885 A1 | 3/2013 | Taneja |
| 2013/0088019 A1 | 4/2013 | Huang et al. |
| 2013/0099065 A1 | 4/2013 | Stuhlberger |
| 2013/0139515 A1 | 6/2013 | Schlak |
| 2013/0154359 A1 | 6/2013 | Huang et al. |
| 2013/0184958 A1 | 7/2013 | Dyrla et al. |
| 2013/0227950 A1 | 9/2013 | Anderson et al. |
| 2013/0251525 A1 | 9/2013 | Saiz |
| 2013/0306024 A1 | 11/2013 | Rolt |
| 2014/0010652 A1 | 1/2014 | Suntharalingam et al. |
| 2014/0060995 A1 | 3/2014 | Anderson et al. |
| 2014/0151495 A1 | 6/2014 | Kuhn, Jr. |
| 2014/0250861 A1 | 9/2014 | Eames |
| 2014/0283519 A1 | 9/2014 | Mariotto et al. |
| 2014/0290208 A1 | 10/2014 | Rechain et al. |
| 2014/0339371 A1 | 11/2014 | Yates et al. |
| 2014/0345281 A1 | 11/2014 | Galbraith |
| 2014/0346283 A1 | 11/2014 | Salyer |
| 2014/0367510 A1 | 12/2014 | Viala et al. |
| 2014/0367525 A1 | 12/2014 | Salyer |
| 2014/0369810 A1 | 12/2014 | Binks et al. |
| 2015/0013306 A1 | 1/2015 | Shelley |
| 2015/0028594 A1 | 1/2015 | Mariotto |
| 2015/0151844 A1 | 6/2015 | Anton et al. |
| 2015/0380999 A1 | 12/2015 | Joshi et al. |
| 2016/0340051 A1 | 11/2016 | Edwards et al. |
| 2017/0297728 A1* | 10/2017 | Niergarth ................ B64D 27/24 |
| 2018/0080411 A1* | 3/2018 | Miller ................ F02K 3/06 |
| 2018/0106274 A1* | 4/2018 | Moniz ................ F02C 3/04 |

FOREIGN PATENT DOCUMENTS

| | | |
|---|---|---|
| WO | WO2010/020199 A1 | 2/2010 |
| WO | WO2014/072615 A1 | 5/2014 |

OTHER PUBLICATIONS

Bradley et al., "Subsonic Ultra Green Aircraft Research, Phase II: N+4 Advanced Concept Development," NASA/CR-2012-217556, May 2012.
U.S. Appl. No. 15/095,249, filed Apr. 11, 2016.
U.S. Appl. No. 15/095,262, filed Apr. 11, 2016.
U.S. Appl. No. 15/132,298, filed Apr. 19, 2016.
U.S. Appl. No. 15/132,304, filed Apr. 19, 2016.
European Search Report issued in connection with corresponding EP Application No. 18163637.4-1010 dated Aug. 8, 2018.

* cited by examiner

| | FPR | P (HP) | RPM | $r_{hub}$ (in) | $n_{poles}$ | $\dfrac{n_{poles}}{\sqrt{P}}$ |
|---|---|---|---|---|---|---|
| 1 | 1.3 | 671 | 7,059 | 4.48 | 34 | 1.313 |
| 2 | 1.1 | 1,341 | 2,370 | 10.66 | 102 | 2.785 |
| 3 | 1.2 | 2,011 | 3,036 | 9.37 | 80 | 1.784 |
| 4 | 1.4 | 2,682 | 4,425 | 7.87 | 54 | 1.047 |
| 5 | 1.2 | 3,352 | 2,352 | 12.10 | 102 | 1.763 |
| 6 | 1.5 | 4,023 | 4,353 | 8.74 | 56 | 0.883 |

FIG. 8

ELECTRIC PROPULSION SYSTEM FOR AN AIRCRAFT

FIELD

The present subject matter relates generally to an aircraft propulsion system and more particularly to an aircraft propulsion system including an electric fan assembly.

BACKGROUND

Hybrid-electric propulsion systems may provide certain efficiency benefits for aircraft, such as commercial passenger aircraft. Certain hybrid electric propulsion systems include an electric power source providing electricity to an electric propulsor. The electric propulsor may generally include an electric motor and a propulsor, with the electric motor driving the propulsor. One issue with utilizing an electric propulsor, however, is ensuring a maximum efficiency and/or power density of the electric motor. Accordingly, a hybrid-electric propulsion system including an electric motor designed to have a desired power density, and further to operate efficiently with an aircraft within which it is installed would be useful.

BRIEF DESCRIPTION

Aspects and advantages of the invention will be set forth in part in the following description, or may be obvious from the description, or may be learned through practice of the invention.

In one exemplary embodiment of the present disclosure, an aeronautical propulsion system is provided defining a central axis. The propulsion system includes a fan having a plurality of fan blades rotatable about the central axis and defining a fan pressure ratio, FPR. The propulsion system also includes an electric motor mechanically coupled to the fan for driving the fan, the electric motor including a number of poles, $n_{poles}$, and defining a maximum power, P. The relationship between the fan pressure ratio, FPR, of the fan, the number of poles, $n_{poles}$, of the electric motor, and the maximum power, P, of the electric motor is defined by an equation:

$$\frac{n_{pole}}{\sqrt{p}} = C_1 \cdot e^{-9.062 \cdot FPR} + C_2 \cdot e^{-1.2604 \cdot FPR};$$

wherein $C_1$ is a constant having a value between 22,000 and 52,000, wherein $C_2$ is a constant having a value between 4.0 and 9.8, and wherein e is Euler's number.

In certain exemplary embodiments, the number of poles, $n_{poles}$, is between 4 and 180, wherein the maximum power, P, is between 650 horsepower and 6,000 horsepower, and wherein the fan pressure ratio, FPR, is between 1 and 2.

In certain exemplary embodiments, the electric motor operates at a maximum pole passing frequency between about 1,500 Hertz ("Hz") and about 3,500 Hz.

In certain exemplary embodiments, the electric motor is connected directly to the fan without use of a gearbox.

In certain exemplary embodiments, the fan and the electric motor are together configured as a boundary layer ingestion fan.

In certain exemplary embodiments, the fan and the electric motor are together configured as an aft fan configured to be mounted at the aft end of the aircraft.

In certain exemplary embodiments, the fan defines a hub radius, wherein the plurality of fan blades define a fan radius, wherein a ratio of the hub radius to the fan radius is between about 0.2 and about 0.4. For example, in certain exemplary embodiments, the ratio of the hub radius to the fan radius is between about 0.25 and about 0.3.

In certain exemplary embodiments, the propulsion system further includes a combustion engine, an electric generator mechanically coupled to the combustion engine for producing electrical power, and a power bus electrically connecting the electric generator to the electric motor, wherein the power bus includes power electronics. For example, in certain exemplary embodiments the power electronics utilize one or more Silicon Carbide components. Additionally, or alternatively, in certain exemplary embodiments the power electronics are configured to operate at a switching frequency between about 5 kilohertz (kHz) and about 30 kHz.

In certain exemplary embodiments, the fan defines a maximum fan tip speed, wherein the maximum fan tip speed is between about 200 feet per second and about 1,350 feet per second.

In another exemplary embodiment of the present disclosure, an electric fan assembly of an aeronautical propulsion system is provided. The electric fan assembly includes a fan defining a fan pressure ratio, FPR, a hub radius, and a fan radius. A ratio of the hub radius to the fan radius is between about 0.2 and about 0.4. The electric fan assembly additionally includes an electric motor directly mechanically coupled to the fan for driving the fan, the electric motor including a number of poles, $n_{poles}$, defining a maximum power, P, and operating at a maximum pole passing frequency between about 1,500 Hertz ("Hz") and about 2,500 Hz. The relationship between the fan pressure ratio, FPR, of the fan, the number of poles, $n_{poles}$, of the electric motor, and the maximum power, P, of the electric motor is defined by an equation:

$$\frac{n_{pole}}{\sqrt{p}} = C_1 \cdot e^{-9.062 \cdot FPR} + C_2 \cdot e^{-1.2604 \cdot FPR};$$

wherein $C_1$ is a constant having a value between 22,000 and 37,000, wherein $C_2$ is a constant having a value between 4.0 and 7.0, and wherein e is Euler's number.

In certain exemplary embodiments, the fan further defines a maximum fan tip speed, wherein the maximum fan tip speed is between about 200 feet per second and about 1,350 feet per second.

In certain exemplary embodiments, the ratio of the hub radius to the fan radius is between about 0.25 and about 0.3.

In an exemplary aspect of the present disclosure, a method for operating a propulsion system for an aircraft is provided. The propulsion system includes a fan having a plurality of fan blades and an electric motor mechanically coupled to the fan. The method includes driving the fan using the electric motor, wherein the relationship between a fan pressure ratio, FPR, of the fan, a number of poles, $n_{poles}$, of the electric motor, and a maximum power, P, of the electric motor is defined by an equation:

$$\frac{n_{pole}}{\sqrt{p}} = C_1 \cdot e^{-9.062 \cdot FPR} + C_2 \cdot e^{-1.2604 \cdot FPR},$$

wherein $C_1$ is a constant having a value between 22,000 and 52,000, wherein $C_2$ is a constant having a value between 4.0 and 9.8, and wherein e is Euler's number.

In certain exemplary aspects, driving the fan using the electric motor includes operating the electric motor at a maximum pole passing frequency between about 1,500 Hertz ("Hz") and about 3,500 Hz.

In certain exemplary aspects, driving the fan using the electric motor includes rotating the fan at a rotational speed equal to a rotational speed of a rotor of the electric motor.

In certain exemplary aspects, the propulsion system further includes a combustion engine, an electric generator mechanically coupled to the combustion engine, and a power bus electrically connecting the electric generator to the electric motor with such an exemplary aspect, the method may further include generating electrical power with the electric generator, and providing the electrical power generated to the electric motor through the power bus. For example, in certain exemplary aspects providing the electrical power generated to the electric motor through the power bus includes passing the electrical power through power electronics operating at a switching frequency between about 5 kilohertz (kHz) and about 30 kHz.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 8 is a chart depicting a plurality of examples.

DETAILED DESCRIPTION

Figure 1:
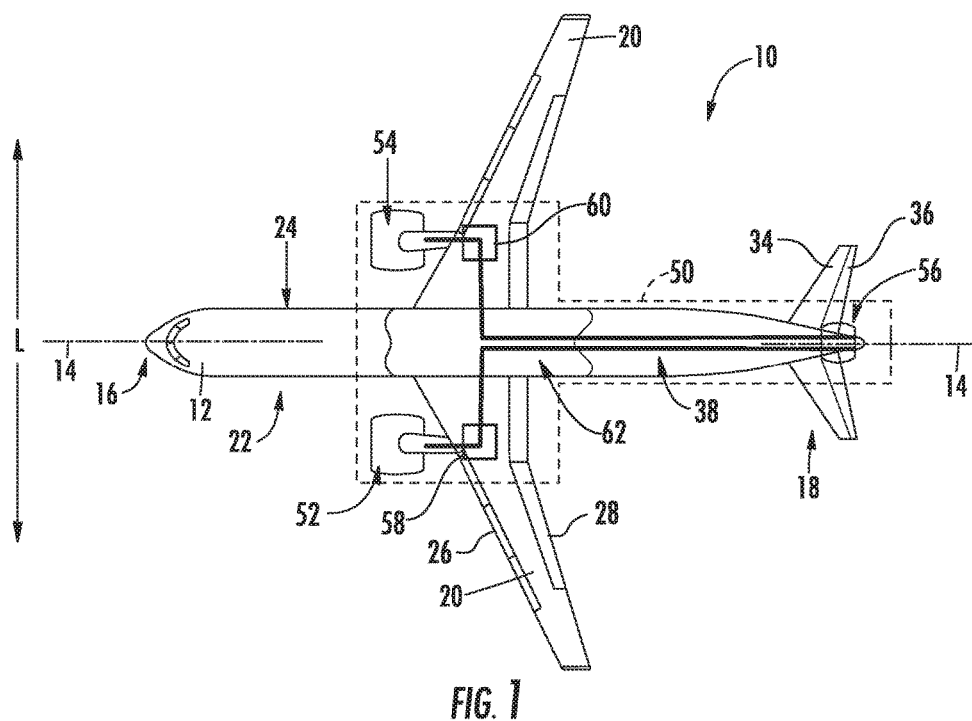
FIG. 1 is a top view of an aircraft according to various exemplary embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within an engine or vehicle, and refer to the normal operational attitude of the engine vehicle. For example, with regard to an engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Figure 2:
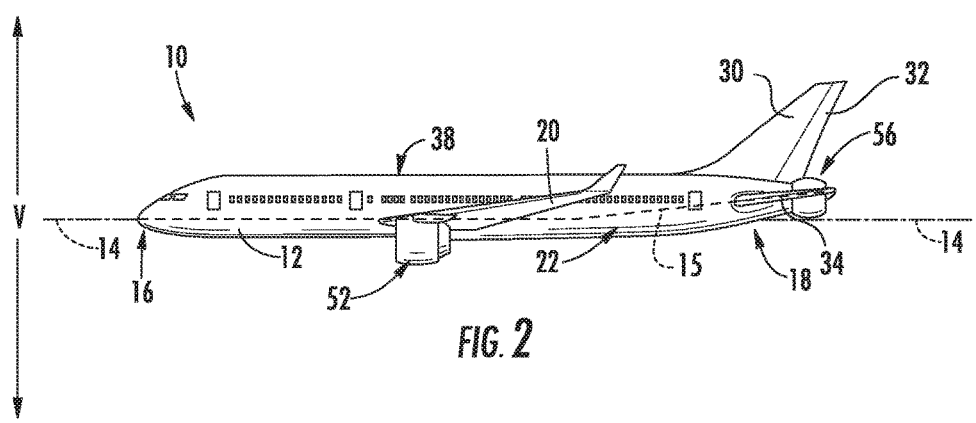
FIG. 2 is a port side view of the exemplary aircraft of FIG. 1

Referring now to the drawings, wherein identical numerals indicate the same elements throughout the figures, FIG. 1 provides a top view of an exemplary aircraft 10 as may incorporate various embodiments of the present invention. FIG. 2 provides a port side view of the aircraft 10 as illustrated in FIG. 1. As shown in FIGS. 1 and 2 collectively, the aircraft 10 defines a longitudinal centerline 14 that extends therethrough, a vertical direction V, a lateral direction L, a forward end 16, and an aft end 18. Moreover, the aircraft 10 defines a mean line 15 extending between the forward end 16 and aft end 18 of the aircraft 10. As used herein, the "mean line" refers to a midpoint line extending along a length of the aircraft 10, not taking into account the appendages of the aircraft 10 (such as the wings 20 and stabilizers discussed below).

Moreover, the aircraft 10 includes a fuselage 12, extending longitudinally from the forward end 16 of the aircraft 10 towards the aft end 18 of the aircraft 10, and a pair of wings 20. As used herein, the term "fuselage" generally includes all of the body of the aircraft 10, such as an empennage of the aircraft 10. The first of such wings 20 extends laterally outwardly with respect to the longitudinal centerline 14 from a port side 22 of the fuselage 12 and the second of such wings 20 extends laterally outwardly with respect to the longitudinal centerline 14 from a starboard side 24 of the fuselage 12. Each of the wings 20 for the exemplary embodiment depicted includes one or more leading edge flaps 26 and one or more trailing edge flaps 28. The aircraft 10 further includes a vertical stabilizer 30 having a rudder flap 32 for yaw control, and a pair of horizontal stabilizers 34, each having an elevator flap 36 for pitch control. The fuselage 12 additionally includes an outer surface or skin 38. It should be appreciated however, that in other exemplary embodiments of the present disclosure, the aircraft 10 may additionally or alternatively include any other suitable configuration of stabilizer that may or may not extend directly along the vertical direction V or horizontal/lateral direction L.

The exemplary aircraft 10 of FIGS. 1 and 2 includes a propulsion system 50, herein referred to as "system 50". The exemplary system 50 includes one or more aircraft engines and one or more electric propulsion engines. For example, the embodiment depicted includes a plurality of aircraft engines, each configured to be mounted to the aircraft 10, such as to one of the pair of wings 20, and an electric propulsion engine. More specifically, for the embodiment depicted, the aircraft engines are configured as gas turbine engines, or rather as turbofan jet engines 52, 54 attached to and suspended beneath the wings 20 in an under-wing configuration. Additionally, the electric propulsion engine is configured as an electric fan assembly 56 configured to be mounted at the aft end of the aircraft 10, and hence the electric propulsion engine depicted may be referred to as an "aft engine." Further, the electric fan assembly 56 depicted is configured to ingest and consume air forming a boundary layer over the fuselage 12 of the aircraft 10. Accordingly, the exemplary electric fan assembly 56 depicted in FIGS. 1 and 2 may also be referred to as a boundary layer ingestion (BLI) fan. The electric fan assembly 56 is mounted to the aircraft 10 at a location aft of the wings 20 and/or the jet engines 52, 54. Specifically, for the embodiment depicted, the electric fan assembly 56 is fixedly connected to the fuselage 12 at the aft end 18, such that the electric fan assembly 56 is incorporated into or blended with a tail section at the aft end 18, and such that the mean line 15 extends therethrough.

It should be appreciated, however, that in other exemplary embodiments of the present disclosure the electric fan assembly 56 may instead be configured in any other suitable manner, and may not necessarily be configured as an aft fan or as a BLI fan. For example, in other exemplary embodiments, the electric fan assembly 56 may be mounted to one or more of the wings 20 in an under-wing configuration.

Referring still to the embodiment of FIGS. 1 and 2, in certain embodiments the propulsion system 50 further includes one or more electric generators operable with the jet engines 52, 54. More specifically, for the embodiment depicted, the propulsion system 50 further includes a first electric generator 58 operable with the first jet engine 52 and a second electric generator 60 operable with the second jet engine 54. For example, one or both of the jet engines 52, 54 may be configured to provide mechanical power from a rotating shaft (such as an LP shaft or HP shaft) to the respective electric generators 58, 60. Although depicted schematically outside the respective jet engines 52, 54, in certain embodiments, the electric generators 58, 60 may be positioned within a respective jet engine 52, 54. Additionally, it will be appreciated that the electric generators 58, 60 are configured to convert the mechanical power to electrical power. For the embodiment depicted, the propulsion system 50 includes an electric generator 58, 60 for each jet engine 52, 54, and an electric power bus 62 electrically connecting the electric generators 58, 60 with the electric fan assembly 56. Additional details of the electric power bus 62 will be described below with reference to FIG. 6. Accordingly, in such an embodiment, the propulsion system 50 may be referred to as a gas-electric propulsion system 50.

It should be appreciated, however, that the aircraft 10 and propulsion system 50 depicted in FIGS. 1 and 2 are provided by way of example only and that in other exemplary embodiments of the present disclosure, any other suitable aircraft 10 may be provided having a propulsion system 50 configured in any other suitable manner. For example, in other embodiments, the electric fan assembly 56 may be incorporated into the fuselage of the aircraft 10, and thus configured as a "podded engine," or pod-installation engine. Further, in still other embodiments, the electric fan assembly 56 may be incorporated into a wing of the aircraft 10, and thus may be configured as a "blended wing engine." Moreover, in other embodiments, the electric fan assembly 56 may not be a boundary layer ingestion fan, and instead may be mounted at any suitable location on the aircraft 10 as a freestream ingestion fan.

Furthermore, in certain embodiments the first and second jet engines 52, 54 of the propulsion system 50 may be configured as turbofan engines, such as high bypass turbofan engines. However, in other embodiments, the propulsion system 50 may have any other suitable jet engines, such as turboprop engines, turbojet engines, etc. Further, although the propulsion system 50 includes two jet engines, in other embodiments, the propulsion system 50 may have any other suitable number of jet engines, with one or more of which driving an electric generator. Further, still, in other embodiments, the propulsion system 50 may not include any jet engines, and may instead have any other suitable engine(s) rotating generator(s) for producing electrical power.

Figure 3:
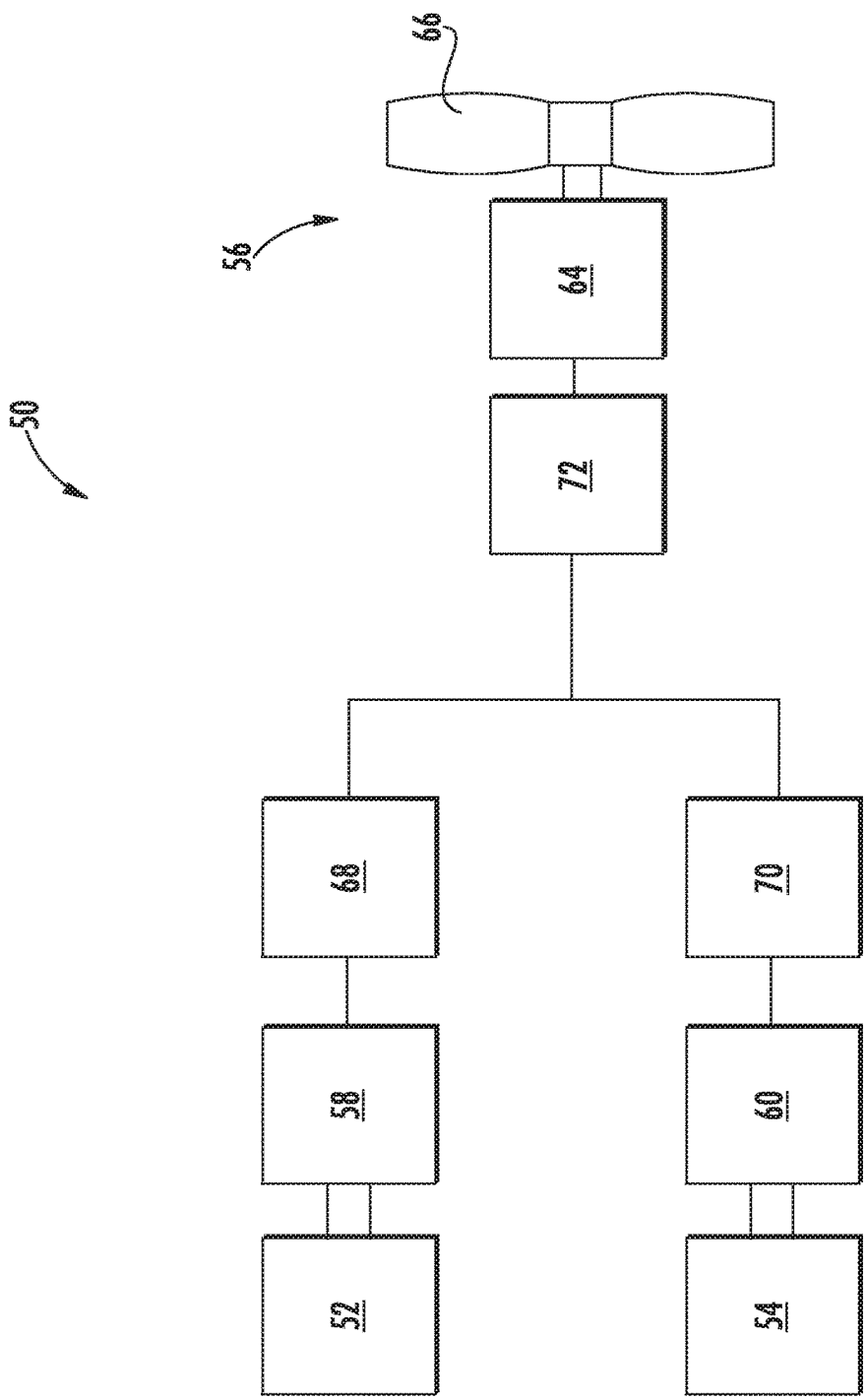
FIG. 3 is a schematic view of a propulsion system for an aircraft in accordance with an exemplary embodiment of the present disclosure.

Referring now also to FIG. 3, a schematic view is provided of an exemplary aeronautical propulsion system 50, which may be similar to the exemplary aeronautical propulsion system 50 of FIGS. 1 and 2. For example, the exemplary propulsion system 50 includes a first engine 52, a second engine 54, an electric fan assembly 56 and a power bus 62. More specifically, the first engine 52 is coupled to a first generator 58, for driving the first generator 58, and the second engine 54 is coupled to a second generator 60 for driving the second generator 60. As with the exemplary propulsion system 50 discussed above with reference to FIGS. 1 and 2, in certain exemplary embodiments, the first and second engines 52, 54 may be configured as, e.g., turbofan jet engines, turboprop engines, turbojet engines, or any other suitable engine capable of rotating a respective generator.

The electric fan assembly 56 is electrically coupled to the first and second generators 58, 60 through an electric power bus 62. Additionally, the electric fan assembly 56 generally includes an electric motor 64 and a fan 66, the fan 66 coupled to and being driven by the electric motor 64. The electric motor 64 of the electric fan assembly 56 is electrically coupled to the first and second electric generators 58, 60 through the electric power bus 62.

Notably, however, in other exemplary embodiments, the propulsion system 50 may have any other suitable configuration. For example, in other exemplary embodiments, the propulsion system 50 may include any other suitable number of engines and respective generators, and further the electric fan assembly 56 of the propulsion system 50 may have any other suitable number of electric motors and respective fans (e.g., one motor, one generator, and one electric fan; one motor, one generator, and two electric fans; two motors, two generators, and one electric fan; etc.). Further, when multiple engines and/or generators are included, or when multiple electric motors and propulsors are included, the electric power bus 62 may electrically connect the various components in series, in parallel, or a combination of series in parallel.

Referring still to FIG. 3, in certain exemplary embodiments the first and second electric generators 58, 60 may be configured to generate alternating current ("AC") electrical power. Additionally, the electric motor 64 of the electric fan assembly 56 may be configured to operate on AC electrical power. However, the electric power bus 62 may be designed to transmit electrical power in a direct current ("DC") form. Accordingly, the power bus 62 includes power electronics to convert or condition the electrical power transmitted. Specifically, the power bus 62 includes a first AC/DC converter power electronics 68 for receiving AC electrical power from the first generator 58 and converting such AC electrical power to DC electrical power; a second AC/DC converter power electronics 70 for receiving AC electrical power from the second generator 60 and converting such AC electrical power to DC electrical power; and a DC/AC converter power electronics 72 for receiving DC electrical power transmitted through the power bus 62 from the first and second electric generators 58, 60 (converted through the first and second AC/DC converter power electronics 68, 70) and converting such DC electrical power to AC electrical power. The power bus 62 further provides such AC electrical power to the electric motor 64 for operating the electric motor 64.

In certain exemplary embodiments, the power electronics of the power bus 62 may be configured to operate at a relatively high switching frequency, $f_{switch}$. As used herein the term "switching frequency", with reference to the power electronics, refers to the rate at which an inverter or converter of the power electronics is switched on and off when converting DC power to AC power or vice versa. For example, in certain exemplary embodiments, the power electronics may be configured to operate at a switching frequency, $f_{switch}$, between about five (5) kilohertz ("kHz") and about thirty (30) kHz. Additionally, in order to allow for these switching frequencies, the power electronics may utilize one or more Silicon Carbide (SiC) components. For example, one or more of the inverters, converters, etc. may be formed of Silicon Carbide.

It should be appreciated, however, that in other exemplary embodiments, the propulsion system 50 may include any other suitable configuration. For example, the electric motor 64 may operate on the DC electrical power, in which case the propulsion system may not include the DC/AC converter power electronics 72. Additionally, or alternatively, in other exemplary embodiments one or both of the generators 58, 60 may be configured to generate DC electrical power, in which case the propulsion system may not include one or both of the first and second AC/DC converter power electronics 68, 70. Other configurations are contemplated as well.

Figure 4:
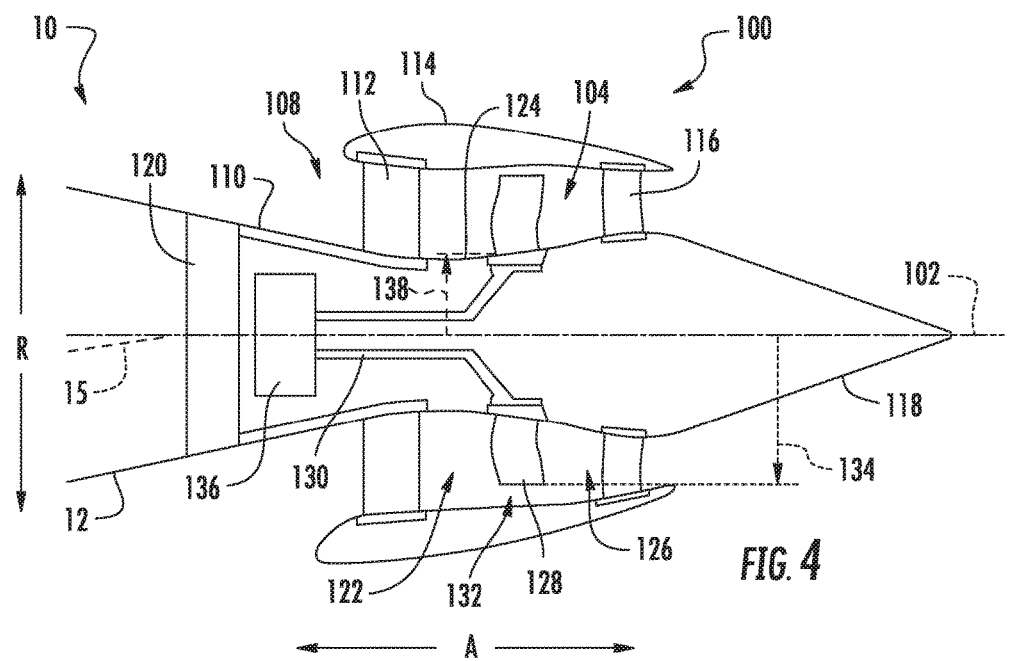
FIG. 4 is a schematic, cross-sectional view of an electric fan assembly in accordance with an exemplary embodiment of the present disclosure.

Referring now to FIG. 4, a schematic, cross-sectional side view of an electric fan assembly 100 in accordance with various embodiments of the present disclosure is provided. The electric fan assembly 100 depicted is configured to be mounted to an aircraft 10 at an aft end 18 of the aircraft 10 and is further configured to ingest a boundary layer air. Accordingly, for the embodiment depicted, the electric fan assembly 100 is configured as a boundary layer ingestion (BLI), aft fan. The electric fan assembly 100 may be configured in substantially the same manner as one or more of the electric fan assemblies 56 described above with reference to FIGS. 1 through 3, and similarly the aircraft 10 depicted in FIG. 4 may be configured in substantially the same manner as the exemplary aircraft 10 described above with reference to FIGS. 1 and 2.

As shown in FIG. 4, the electric fan assembly 100 defines an axial direction A extending along a longitudinal centerline axis 102 (or center axis) that extends therethrough for reference, as well as a radial direction R and a circumferential direction C (a direction extending about the axial direction A; not shown). Additionally, the aircraft 10 defines a mean line 15 extending therethrough (see FIG. 4).

In general, the electric fan assembly 100 includes a fan 104 rotatable about the centerline axis 102 and a structural support system 108. The structural support system 108 is configured for mounting the electric fan assembly 100 to the aircraft 10, and for the embodiment depicted generally includes an inner frame support 110, a plurality of forward support members 112, an outer nacelle 114, a plurality of aft support members 116, and a tail cone 118. As is depicted, the inner frame support 110 is attached to a bulkhead 120 of the fuselage 12. The plurality of forward support members 112 are attached to the inner frame support 110 and extend outward generally along the radial direction R to the nacelle 114. The nacelle 114 defines an airflow passage 122 with an inner casing 124 of the electric fan assembly 100, and at least partially surrounds the fan 104. Further, for the embodiment depicted, the nacelle 114 extends substantially three hundred and sixty degrees (360°) around the mean line 15 of the aircraft 10. The plurality of aft support members 116 also extend, for the embodiment depicted, generally along the radial direction R from, and structurally connect, the nacelle 114 to the tail cone 118.

In certain embodiments, the forward support members 112 and the aft support members 116 may each be generally spaced along the circumferential direction C of the electric fan assembly 100. Additionally, in certain embodiments the forward support members 112 may be generally configured as inlet guide vanes and the aft support members 116 may generally be configured as outlet guide vanes. If configured in such a manner, the forward and aft support members 112, 116 may direct and/or condition an airflow through the airflow passage 122 of the electric fan assembly 100. Notably, one or both of the forward support members 112 or aft support members 116 may additionally be configured as variable guide vanes. For example, the support member may include a flap (not shown) positioned at an aft end of the support member for directing a flow of air across the support member.

It should be appreciated, however, that in other exemplary embodiments, the structural support system 108 may instead include any other suitable configuration and, e.g., may not include each of the components depicted and described above. For example, in other exemplary embodiments, the electric fan assembly 100 may not include the forward and aft support members 112, 116 or the nacelle 114. Alternatively, the structural support system 108 may include any other suitable components not depicted or described above.

The electric fan assembly 100 additionally defines a nozzle 126 between the nacelle 114 and the tail cone 118. The nozzle 126 may be configured to generate an amount of thrust from the air flowing therethrough, and the tail cone 118 may be shaped to minimize an amount of drag on the electric fan assembly 100. However, in other embodiments, the tail cone 118 may have any other shape and may, e.g., end forward of an aft end of the nacelle 114 such that the tail cone 118 is enclosed by the nacelle 114 at an aft end.

Referring still to FIG. 4, the fan 104 includes a plurality of fan blades 128 and a fan shaft 130, with each of the plurality of fan blades 128 defining a tip 132 at an outer end of the respective fan blade 128 along the radial direction R. Additionally, the fan 104 defines a radius 134 equal to a radius of each of the fan blades 128 along the radial direction R from the centerline axis 102 to the tips 132 of the fan blades 128. The plurality of fan blades 128 are attached to the fan shaft 130 and spaced generally along the circumferential direction C of the electric fan assembly 100. Moreover, as is depicted the plurality fan blades 128 are, for the embodiment of FIG. 4, at least partially enclosed by the nacelle 114.

In certain exemplary embodiments, the plurality of fan blades 128 may be attached in a fixed manner to the fan shaft 130, or alternatively, the plurality of fan blades 128 may be rotatably attached to the fan shaft 130. For example, the plurality of fan blades 128 may be attached to the fan shaft 130 such that a pitch of each of the plurality of fan blades 128 may be changed, e.g., in unison, by a pitch change mechanism (not shown). Changing the pitch of the plurality of fan blades 128 may increase an efficiency of the electric fan assembly 100 and/or may allow the electric fan assembly 100 to achieve a desired thrust profile. With such an exemplary embodiment, the electric fan assembly 100 may be referred to as a variable pitch fan.

Additionally, it will be appreciated that the fan 104 of the electric fan assembly 100 defines a fan pressure ratio, FPR, during operation, and more particularly during operation at a rated speed. As used herein, the term "fan pressure ratio" refers to a ratio of a discharge pressure of a fan to an inlet pressure of the fan. Additionally, the term "rated speed" refers to a maximum operating speed of the fan during normal operations. For example, the electric fan assembly 100 may operate at the rated speed during maximum thrust operations, such as during takeoff operations.

In addition to defining the fan pressure ratio, FPR, during operation of the electric fan assembly 100 at the rated speed, the fan shaft 130 defines a maximum rotational speed of the fan shaft 130 (i.e., a maximum rotational fan shaft speed, N) and the plurality of fan blades 128 of the fan 104 define a maximum speed at the fan blade tips 132 (i.e., a fan tip speed, U). As will be appreciated, the fan tip speed, U, may generally be determined by multiplying the maximum fan shaft speed, N, of the fan shaft 130 by the radius 134 of the fan 104. Additionally, it will be appreciated, that the maximum fan tip speed, U, may be a function of the material forming the plurality of fan blades 128 and/or other components of the fan 104. For example, in certain exemplary embodiments, the maximum fan tip speed, U, may be between about 200 feet per second and about 1,350 feet per second, such as between about 500 feet per second and about 1,000 feet per second.

Moreover, for the embodiment depicted, the fan 104 is rotatable about the centerline axis 102 of the electric fan assembly 100 by an electric machine. More particularly, the fan 104 is rotatable about the centerline axis 102 by an electric motor 136, the electric motor 136 capable of providing a maximum amount of power (i.e., a maximum amount of power, P, of the electric motor 136) during operation of the electric fan assembly 100 at the rated speed. For the embodiment depicted, the electric motor 136 is directly connected to the fan 104 through the fan shaft 130. Accordingly, for the embodiment depicted, the electric motor 136 is connected directly to the fan 104 without use of a gearbox or other reduction mechanism. It will therefore be appreciated that the rotational fan shaft speed, N, of the fan shaft 130 will be the same as the rotational speed of the fan 104 and a rotor 142 of the electric motor 136 (described in more detail below).

Notably, referring still to FIG. 4, the fan 104 of the electric fan assembly 100 further defines a hub radius 138. More specifically, the inner casing 124 of the electric fan assembly 100 defines the hub radius 138. The hub radius 138 refers to a distance along the radial direction R from the centerline axis 102 to an outer surface of the inner casing 124 at a forward edge of the plurality of fan blades 128 of the fan 104. Notably, for the embodiment depicted, the electric fan assembly 100 defines a ratio of the hub radius 138 to the fan radius (i.e., fan blade radius 134) between about 0.2 and about 0.4, or more particularly between about 0.25 and about 0.3. Such a configuration may allow for, e.g., mounting the electric motor 136 in a desired manner within the inner casing 124.

Figure 5:
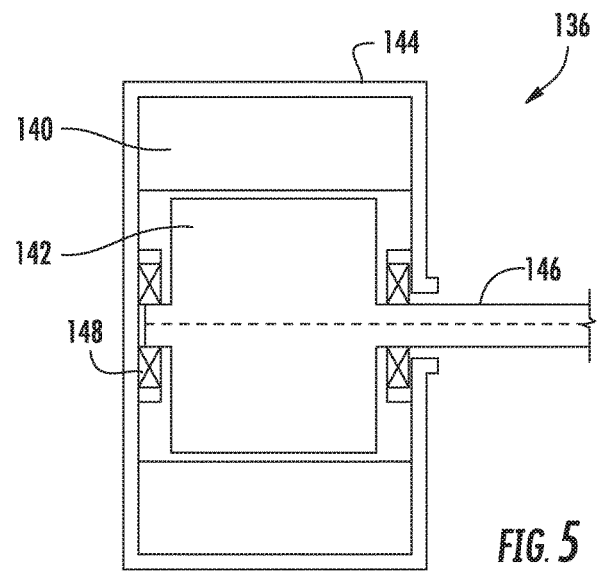
FIG. 5 is a close-up, cross-sectional view of an electric motor for the exemplary electric fan assembly of FIG. 4 in accordance with an exemplary embodiment of the present disclosure.
Figure 6:
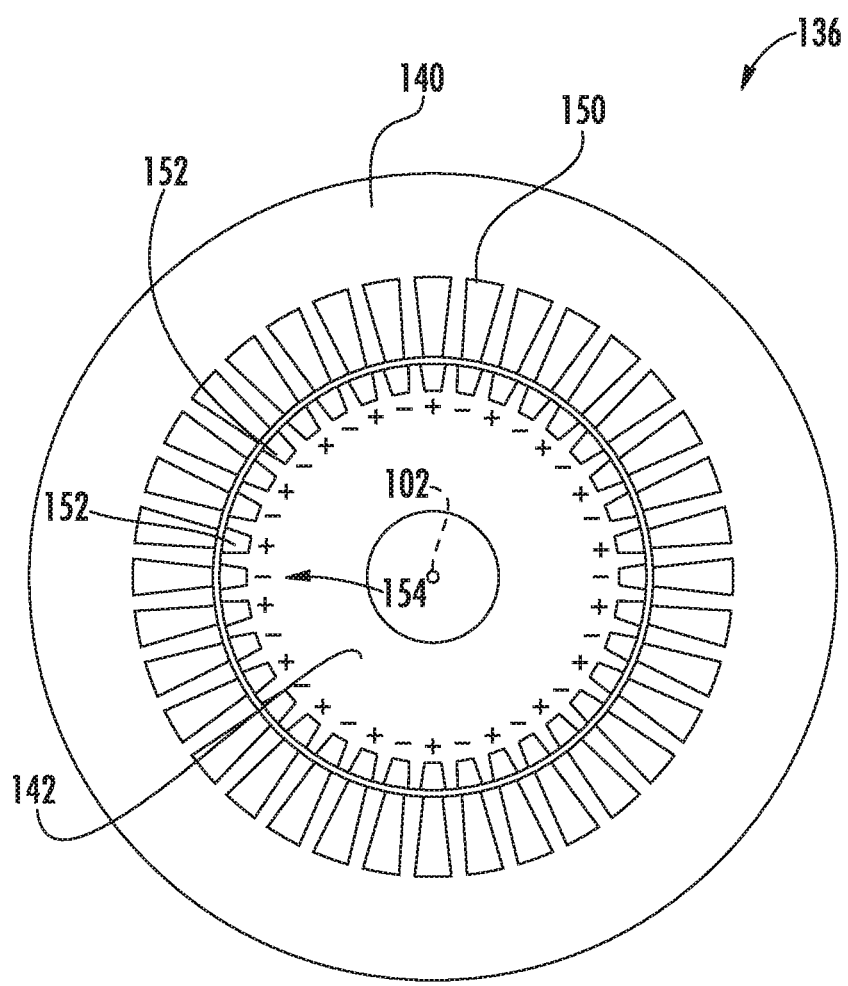
FIG. 6 is another close-up, cross-sectional view of the exemplary electric motor for the electric fan assembly of FIG. 4, taken along a centerline axis.

Furthermore, referring now also to FIGS. 5 and 6, cross-sectional views of the electric motor 136 are provided. More particularly, FIG. 5 provides a schematic, side cross-sectional view of the electric motor 136; and FIG. 6 provides a schematic, cross-sectional view of the electric motor 136 along the centerline axis 102. As is depicted, the electric motor 136 is generally configured as a synchronous, inrunner electric motor. More particularly, the exemplary electric motor 136 depicted includes a stator 140, a rotor 142 positioned within the stator 140, and an outer casing 144 enclosing the stator 140 and rotor 142. However, in other embodiments, the electric motor 136 may instead be configured as an outrunner (or out-running) electric motor, such that a position of the stator 140 and rotor 142 are reversed, and the rotor 142 is instead located radially outside of the stator 140.

Additionally, the rotor 142 is mounted to an axle or output shaft 146, which for the embodiment depicted is configured as, or coupled to, the fan shaft 130. The electric motor 136 additionally includes a plurality of bearings 148 within the outer casing 144 facilitating rotation of the rotor 142. It should be appreciated, however, that in other exemplary embodiments, the electric motor 136 may instead have any other suitable configuration.

Referring particularly to FIG. 6, the stator 140 includes a plurality of electromagnetic coils 150, and the rotor 142 includes a plurality of segmented magnets 152 having alternating magnetic poles 154 (as indicated using the positive sign "+" and negative sign "−" in FIG. 6), with each alternating pair of poles 154 together configured as a pole pair. The magnets 152 may be permanent magnets, such that the electric motor 136 is a synchronous, permanent magnet electric. Accordingly, it will be appreciated that the electric motor 136 defines a pole count, or number of poles, $n_{poles}$, equal to the number of poles 154. For the embodiment depicted, the electric motor 136 defines a number of poles, $n_{poles}$, equal to thirty six (36). However, in other exemplary embodiments, the electric motor 136 may instead define a number of poles, $n_{poles}$, between four (4) and about two hundred (200). For example, in other exemplary embodiments, the electric motor 136 may define a number of poles, $n_{poles}$, between twelve (12) and one hundred and eighty (180).

Further still, during operation of the electric fan assembly 100, and more specifically during operation of the electric motor 136, the electric motor 136 defines a pole passing frequency, $f_{pass}$, which is sometimes also referred to as a "fundamental frequency". In certain exemplary embodiments, the pole passing frequency, $f_{pass}$, of the electric motor 136 may be between about 1,500 hertz ("Hz") and about 3,500 Hz. For example, in certain exemplary embodiments, the pole passing frequency, $f_{pass}$, of the electric motor 136 may be between about 1,500 Hz and about 3,500 Hz, such as between about 1,500 Hz and about 2,500 Hz, such as between about 1,800 Hz and about 2,200 Hz, such as about 2,000 Hz.

An upper limit on the pole passing frequency, $f_{pass}$, of the electric motor 136 may be a factor of the material forming the electric motor 136, including the rotor 142 and stator 140 of the electric motor 136. For example, in certain exemplary embodiments, the electric motor 136 may be formed of an iron-based material, such as an iron-cobalt material. With such an embodiment, the pole passing frequency, $f_{pass}$, of the electric motor 136 may be between about 1,500 Hz and about 2,500 Hz, such as about 2,000 Hz. Additionally, or alternatively, in other embodiments, the electric motor 136 may be formed of an electric steel material. With such an embodiment, the pole passing frequency, $f_{pass}$, of the electric motor 136 may be between about 2,000 Hz and about 2,700 Hz, such as about 2,250 Hz. Additionally, or alternatively, still, in other embodiments the electric motor 136 may be configured as an air core machine, formed of a resin material or of, e.g., air gaps. With such an embodiment, the pole passing frequency, $f_{pass}$, of the electric motor 136 may be between about 2,500 Hz and about 3,500 Hz, such as about 3,000 Hz.

Operating the electric motor 136 within the above identified pole passing frequencies, $f_{pass}$, may ensure the electric motor 136 is operated with a desired power density. For example, operating in excess of the above identified pole passing frequencies, $f_{pass}$, for a given electric motor 136 may result in diminishing returns in power density and losses in efficiency as a result of increased temperatures and eddy currents. Notably, however, other materials may also be possible for the electric motor 136 and similarly other pole passing frequencies, $f_{pass}$, may also be possible for the materials described above.

Figure 7:
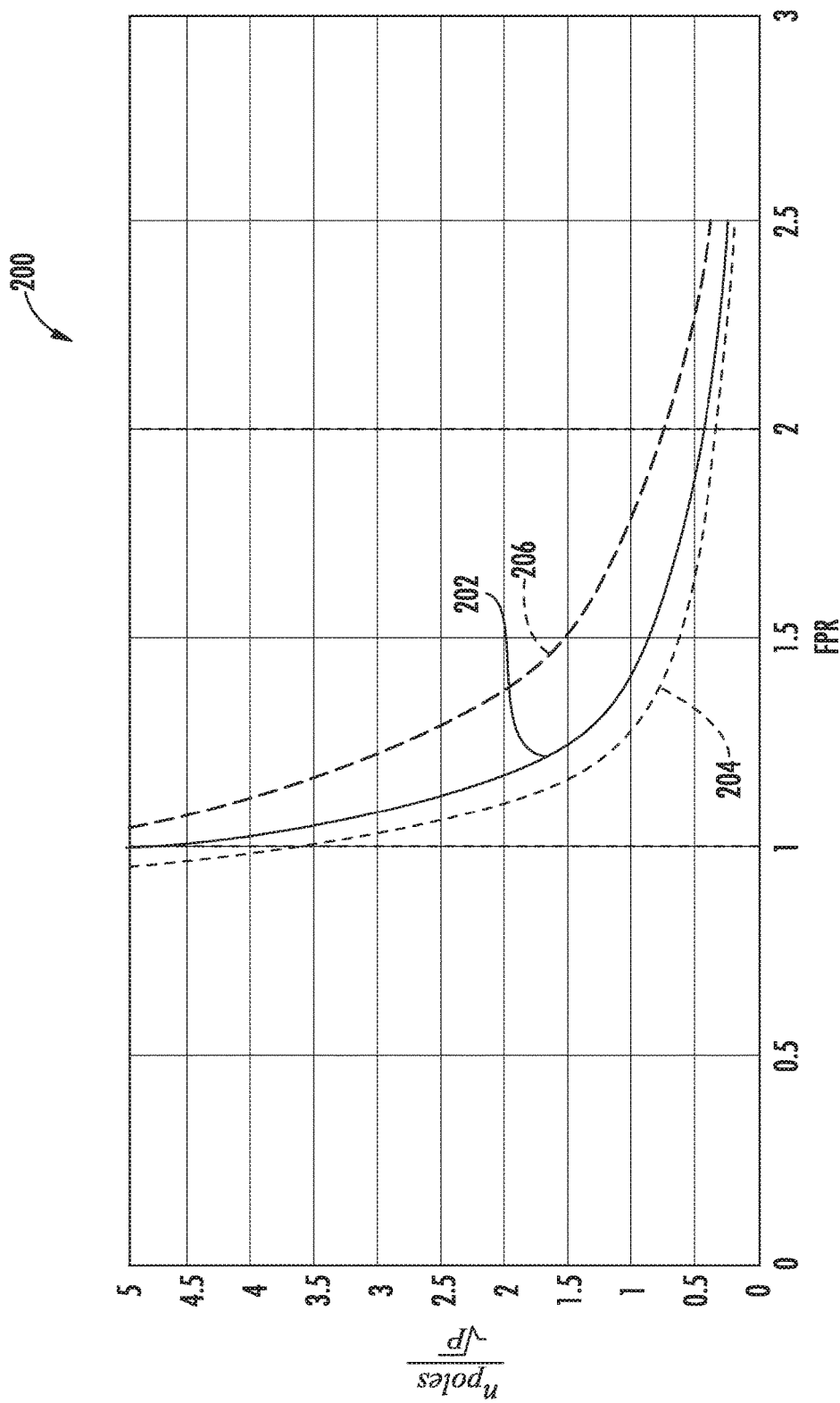
FIG. 7 is a graph depicting a relationship between certain parameters of an electric fan assembly in accordance with an exemplary embodiment of the present disclosure.

Referring now to FIG. 7, a graph 200 is provided depicting a relationship between various parameters of the electric fan assembly 100. In certain embodiments, the parameters depicted in the graph 200 may be parameters of the electric fan assembly 100 described above with reference to FIGS. 4 through 6. For example, the electric fan assembly 100 may include a fan 104 being driven by an electric motor 136 via a fan shaft 130. The fan 104 may define a fan pressure ratio, FPR, and a fan radius 134. Additionally, the fan 104 may include a plurality of fan blades 128 defining a fan tip speed, U. Moreover, the fan shaft 130 may define a rotational speed, N, and the fan assembly 100, or fan 104, may further define a hub radius 138.

Referring particularly to the graph 200 of FIG. 7, the graph 200 depicts at line 202 (described in more detail below) a relationship between the fan pressure ratio, FPR, of the fan 104 of the electric fan assembly 100 and an electric motor parameter of the electric fan assembly 100. More specifically, the electric motor parameter is equal to the number of poles, $n_{poles}$, of the electric motor 136 divided by the square root of the maximum power, P, of the electric motor 136 (in horsepower). The inventors of the present disclosure have discovered that inclusion of an electric fan assembly 100 in a propulsion system 50, wherein the fan pressure ratio, FPR, of the electric fan 104 relates to the electric motor parameter (i.e., pole count, $n_{poles}$, of the electric motor 136 divided by the square root of the maximum power, P, of the electric motor 136) in the manner shown in the graph 200 of FIG. 7, results in an electric fan assembly having a desired overall efficiency and power density.

Specifically, the above discovery began with a derivation of a plurality of equations, making educated assumptions for an electric fan assembly having certain characteristics along the way. For example, the inventors of the present disclosure started with Equation 1, below, defining a maximum power, P, of the electric motor 136. In Equation 1, P is the maximum power of the electric motor 136; $\dot{m}$ is the mass flow rate of an airflow through the fan 104; $c_p$ is the specific heat of the airflow through the fan 104; and $\Delta T$ is the temperature change of the airflow across the fan 104.

$$P = \dot{m} \times c_p \times \Delta T \qquad \text{(Equation 1)}.$$

From this Equation 1, the inventors of the present disclosure recognized that for a given fan pressure ratio, FPR, the temperature change across the fan 104, $\Delta T$, will be constant (assuming operation at constant ambient conditions). Accordingly, from this the inventors determined that the maximum power, P, the electric motor 136 is directly related to the mass flow rate, $\dot{m}$, of the airflow through the fan 104 for a given fan pressure ratio, FPR. Further, the mass flow rate, $\dot{m}$, of the airflow through the fan 104 is directly related to a cross-sectional area, A, of the fan 104, which is in turn directly related to a fan radius 134 of the fan 104 squared, $r^2$ (the fan radius, r, is the same measure as the radius 134 of the fan 104 along the radial direction R, described above with reference to FIG. 4). Additionally, as stated, the relations of the above parameters are based on a given fan pressure ratio, FPR, meaning that each of these parameters is a function of the fan pressure ratio, FPR. These relationships are recognized in Equation 2. Notably, as used herein, the symbol "$\propto$" means directly related to (i.e., a single order relationship).

$$P \propto \dot{m} \propto A \propto r^2 = f(FPR) \qquad \text{(Equation 2)}.$$

Distilled down, Equation 2 may be simplified to Equation 3, below.

$$\sqrt{P} \propto r = f(FPR) \qquad \text{(Equation 3)}.$$

Furthermore, the inventors of the present disclosure further recognized that a fan shaft speed, N, is directly related to a fan tip speed, U, divided by the radius, r, of the fan 104. Assuming a constant fan tip speed, U, and substituting the radius, r, of the fan 104 for the square root of the power, P, based on the relationships recognized in Equation 3, allows for the relationship recognized in Equation 4. More particularly, in Equation 4 the inventors assumed for the embodiment of the present disclosure that the fan tip speed, U, would essentially be a maximum fan tip speed, U, for the desired design, limited by the material properties of the material forming certain components of the fan 104 (see, e.g., discussion above with reference to FIG. 4).

$$N \propto \frac{U}{r} \propto \frac{U}{\sqrt{P}} \propto \frac{1}{\sqrt{P}}. \qquad \text{(Equation 4)}$$

Additionally, the inventors recognized that the number of poles, $n_{poles}$, of the electric motor 136 is a function of the pole passing frequency, $f_{pass}$, over the shaft speed, N. Substituting the shaft speed, N, for one over the square root of power, P, (see Equation 4) allows for the following relationship to be determined in Equation 5.

$$n_{pole} \propto \frac{f}{N} \propto f \times \sqrt{P}. \qquad \text{(Equation 5)}$$

Further, still, the inventors then assumed a desired pole passing frequency, $f_{pass}$. Specifically, for the exemplary propulsion system 50 described above, e.g., with reference to FIG. 4, the inventors assumed the electric motor 136 would have a pole passing frequency, $f_{pass}$, between about 1,500 Hz and about 3,500 Hz, such as between about 1,500 Hz and about 2,500 Hz, such as about 2,000 Hz. More particularly, as described with reference to FIG. 3, the power electronics (e.g., power electronics 68, 70, 72) utilized with the propulsion system may have a maximum switching frequency, $f_{switch}$. The inventors of the present disclosure assumed the maximum switching frequency, $f_{switch}$, of the designed electric fan assembly 100, which influenced the assumed pole passing frequency, $f_{pass}$ (see discussion above with reference to FIG. 4). Regardless, by assuming a constant pole passing frequency, $f_{pass}$, the relationship defined in Equation 5 may be simplified to the relationship defined in Equation 6, below.

$$n_{pole} \propto \sqrt{P} = f(FPR) \quad \text{(Equation 6)}.$$

A person having ordinary skill in the art will appreciate that Equation 6 may be written as Equation 7, below, to state that the number of poles, $n_{poles}$, of the electric motor 136 over the square root of the power, P, of the electric motor 136 is a function of fan pressure ratio, FPR, for an efficient/power dense electric fan assembly.

$$\frac{n_{pole}}{\sqrt{P}} = f(FPR). \quad \text{(Equation 7)}$$

After having distilled that the above parameters are related in the manner shown in Equation 7, the inventors of the present disclosure performed extensive experimentation to confirm the relationship outlined in Equation 7 in fact existed, and further to define what the equation/function was that related fan pressure ratio, FPR, to the number of poles, $n_{poles}$, divided by the square root of power, P.

For example, the inventors of the present disclosure went through numerous examples of potential electric fan assemblies, each example having a set, unique fan pressure ratio, FPR, (e.g., between 1 and 2) and electric motor power, P, (e.g., between 650 hp and 4,500 hp) that would be desirable for the electric fan assembly. Using the constants/assumptions described above, and various models, the inventors of the present disclosure were then able to determine for each example: (a) a resulting RPM for the electric motor 136 (e.g., a rotational shaft speed, N) of the electric fan assembly 100; (b) a resulting hub radius 138 for the electric fan 104; and (c) a resulting pole count, $n_{poles}$, for the electric motor 136. Moreover, with these values determined, the inventors of the present disclosure were then able to determine for each example, an electric motor parameter equal to the number of poles, $n_{poles}$, over the square root of power, P, for the electric motor 136.

For example, referring now briefly to FIG. 8, a table is provided showing six of the above-mentioned examples. With each of these examples, the inventors set the fan pressure ratio, FPR, and electric motor power, P (Columns 1 and 2). Using these values, the assumptions made above, and one or more models, the inventors of the present disclosure were then able to determine for each example, (a) the resulting RPM for the electric motor 136 (e.g., a rotational shaft speed, N) of the electric fan assembly 100 (Column 3); (b) the resulting hub radius 138 for the electric fan 104 (Column 4); and (c) the resulting pole count, $n_{poles}$, for the electric motor 136 (Column 5). Further, the values determined for each of the examples in Column 5, along with the values for each of the examples in Column 2, allowed the inventors to determine the electric motor parameter for each example in Column 6, the electric motor parameter being equal to the number of poles, $n_{poles}$, over the square root of power, P, for the electric motor 136.

Further, in order to determine the function/equation relating the fan pressure ratio, FPR, to the electric motor parameter, the fan pressure ratio, FPR, values for each example (e.g., the values in Column 1 for the examples depicted in FIG. 8) were plotted with the electric motor parameter values for the respective examples (e.g., the values in Column 6 for the examples depicted in FIG. 8). Using these plotted values, a line of best fit was then determined. This line of best fit is depicted as the line 202 in the graph 200 of FIG. 7. The equation for the line 202 was determined to be the following nonlinear, second order differential equation (Equation 8):

$$\frac{n_{pole}}{\sqrt{P}} = C_1 \cdot e^{-9.062 \cdot FPR} + C_2 \cdot e^{-1.2604 \cdot FPR}. \quad \text{(Equation 8)}$$

With the above equation, assuming the pole passing frequency, $f_{pass}$, is 2,000 Hz, the constant, $C_1$, is about 29,450 and the constant, $C_2$, is about 5.528. However, as stated above, the electric fan assembly 100 may include an electric motor 136 having a pole passing frequency, $f_{pass}$, between about 1,500 Hz and about 3,500 Hz. Accordingly, in certain exemplary embodiments, the constant $C_1$ may have a value between 22,000 and 52,000, and the constant, $C_2$, may have a value between 4.0 and 9.8. A lower limit line 204 is provided (with constant, $C_1$, being set equal to 22,000 and constant, $C_2$, being equal to 4.0) for when the pole passing frequency, $f_{pass}$, is equal to about 1,500 Hz, and further, an upper limit line 206 is provided (with the constant, $C_1$, being equal to 52,000 and the constant, $C_2$, being equal to 9.8) for when the pole passing frequency, $f_{pass}$, is equal to about 3,500 Hz. Additionally, for Equation 8, e is Euler's number (approximately 2.718).

Notably, referring back to the discussion of Equations 1 through 7, it will be appreciated that the formula determined in Equation 8 may rely on certain assumptions for the electric fan assembly 100. For example, the formula determined in Equation 8 may rely on a hub radius 138 for the electric fan assembly 100; a fan tip speed, U, of a fan 104 of the electric fan assembly 100; a shaft speed, N, of the electric fan assembly 100; and a pole passing frequency, $f_{pass}$, of an electric motor 136 of the electric fan assembly 100, as stated.

A propulsion system including an electric fan assembly in accordance with one or more embodiments of the present disclosure may provide for an electric fan assembly having a maximum efficiency and power density (e.g., an amount of thrust per unit volume of air flowing through the electric fan assembly) for an electric fan assembly having certain design parameters.

Figure 9:
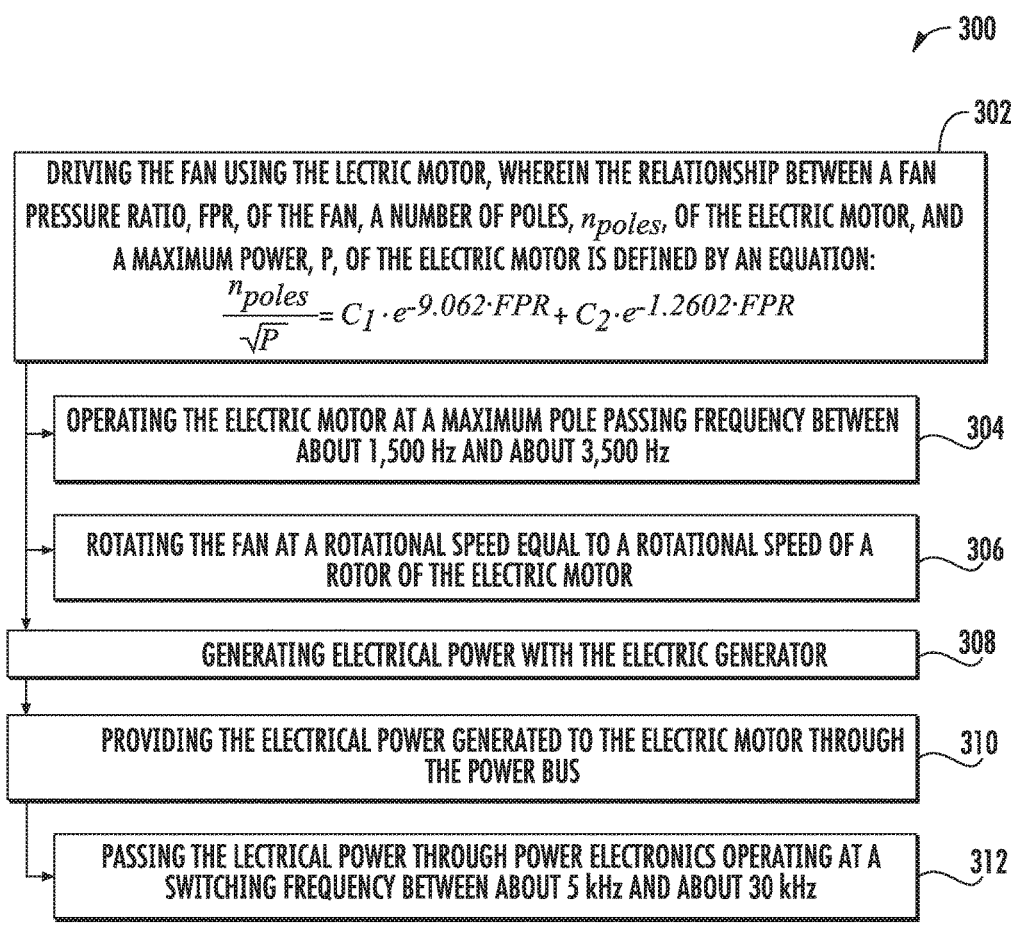
FIG. 9 is a flow diagram depicting a method for operating a propulsion system in accordance with an exemplary aspect of the present disclosure.

Referring now to FIG. 9, a flow chart is provided of a method 300 for operating a propulsion system for an aircraft. The propulsion system may be configured in substantially the same manner as one or more of the exemplary propulsion systems described above. For example, the propulsion system may include a fan having a plurality of fan blades, as well as an electric motor mechanically coupled to the fan.

The exemplary method 300 generally includes at (302) driving the fan using the electric motor, wherein the relationship between a fan pressure ratio, FPR, of the fan, a number of poles, $n_{poles}$, of the electric motor, and a maximum power, P, of the electric motor is defined by an equation:

$$\frac{n_{pole}}{\sqrt{P}} = C_1 \cdot e^{-9.062 \cdot FPR} + C_2 \cdot e^{-1.2604 \cdot FPR}.$$

In certain exemplary aspects, $C_1$ is a constant having a value between 22,000 and 37,000, $C_2$ is a constant having a value between 4.0 and 7.0, and e is Euler's number.

More specifically, for the embodiment depicted, driving the fan using the electric motor at (302) includes at (304) operating the electric motor at a maximum pole passing frequency between about 1,500 Hz and about 2,500 Hz. For example, in certain exemplary aspects, driving the fan using the electric motor at (302) may include operating the electric motor at a maximum pole passing frequency of about 2,000 Hz.

Moreover, for the exemplary aspect depicted, the electric fan may be directly mechanically coupled to the electric motor through, e.g., one or more driveshafts or couplings. Accordingly, with such an exemplary aspect, driving the fan using the electric motor at (302) may include at (306) rotating the fan at a rotational speed equal to a rotational speed of a rotor of the electric motor.

Furthermore, in certain exemplary aspects, the exemplary propulsion system may additionally include a combustion engine, an electric generator mechanically coupled to the combustion engine, and a power bus electrically connecting the electric generator to the electric motor. With such an exemplary aspect, the method 300 may further include at (308) generating electrical power with the electric generator, and at (310) providing the electrical power generated to the electric motor through the power bus. For example, in certain exemplary aspects, generating electrical power with the electric generator at (308) may include driving the electric generator with the combustion engine, with the combustion engine being, e.g., a turbofan engine, a turboprop engine, turbojet engine, a turboshaft engine, etc.

Furthermore, for the exemplary method 300 depicted, providing electrical power generated to the electric motor to the power bus at (310) further includes at (312) passing the electrical power through power electronics operating at a switching frequency between about 5 kilohertz (kHz) and about 30 kHz.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An aeronautical propulsion system defining a central axis and comprising:
a fan having a plurality of fan blades rotatable about the central axis and defining a fan pressure ratio, FPR, wherein the FPR is a ratio of a discharge pressure of a fan to an inlet pressure of the fan; and
an electric motor mechanically coupled to the fan for driving the fan, the electric motor comprising a number of poles, $n_{poles}$, and defining a maximum power, P;
wherein the relationship between the fan pressure ratio, FPR, of the fan, the number of poles, $n_{poles}$, of the electric motor, and the maximum power, P, of the electric motor is defined by an equation:

$$\frac{n_{pole}}{\sqrt{P}} = C_1 \cdot e^{-9.062 \cdot FPR} + C_2 \cdot e^{-1.2604 \cdot FPR};$$

wherein $C_1$ is a constant having a value between 22,000 and 52,000, wherein $C_2$ is a constant having a value between 4.0 and 9.8, and wherein e is Euler's number.

2. The aeronautical propulsion system of claim 1, wherein the number of poles, $n_{poles}$, is between 4 and 180, wherein the maximum power, P, is between 650 horsepower and 6,000 horsepower, and wherein the fan pressure ratio, FPR, is between 1 and 2.

3. The aeronautical propulsion system of claim 1, wherein the electric motor operates at a maximum pole passing frequency between about 1,500 Hertz ("Hz") and about 3,500 Hz.

4. The aeronautical propulsion system of claim 1, wherein the electric motor is connected directly to the fan without use of a gearbox.

5. The aeronautical propulsion system of claim 1, wherein the fan and the electric motor are together configured as a boundary layer ingestion fan.

6. The aeronautical propulsion system of claim 1, wherein the fan and the electric motor are together configured as an aft fan configured to be mounted at the aft end of the aircraft.

7. The aeronautical propulsion system of claim 1, wherein the fan defines a hub radius, wherein the plurality of fan blades define a fan radius, wherein a ratio of the hub radius to the fan radius is between about 0.2 and about 0.4.

8. The aeronautical propulsion system of claim 7, wherein the ratio of the hub radius to the fan radius is between about 0.25 and about 0.3.

9. The aeronautical propulsion system of claim 1, further comprising:
a combustion engine;
an electric generator mechanically coupled to the combustion engine for producing electrical power; and
a power bus electrically connecting the electric generator to the electric motor, wherein the power bus includes power electronics.

10. The aeronautical propulsion system of claim 9, wherein the power electronics utilize one or more Silicon Carbide components.

11. The aeronautical propulsion system of claim 9, wherein the power electronics are configured to operate at a switching frequency between about 5 kilohertz (kHz) and about 30 kHz.

12. The aeronautical propulsion system of claim 1, wherein the fan defines a maximum fan tip speed, and wherein the maximum fan tip speed is between about 200 feet per second and about 1,350 feet per second.

13. An electric fan assembly of an aeronautical propulsion system, the electric fan assembly comprising:
a fan defining a fan pressure ratio, FPR, a hub radius, and a fan radius, wherein the FPR is a ratio of a discharge pressure of a fan to an inlet pressure of the fan, and a ratio of the hub radius to the fan radius being between about 0.2 and about 0.4;

an electric motor directly mechanically coupled to the fan for driving the fan, the electric motor comprising a number of poles, $n_{poles}$, defining a maximum power, P, and operating at a maximum pole passing frequency between about 1,500 Hertz ("Hz") and about 2,500 Hz;

wherein the relationship between the fan pressure ratio, FPR, of the fan, the number of poles, $n_{poles}$, of the electric motor, and the maximum power, P, of the electric motor is defined by an equation:

$$\frac{n_{pole}}{\sqrt{P}} = C_1 \cdot e^{-9.062 \cdot FPR} + C_2 \cdot e^{-1.2604 \cdot FPR};$$

wherein $C_1$ is a constant having a value between 22,000 and 37,000, wherein $C_2$ is a constant having a value between 4.0 and 7.0, and wherein e is Euler's number.

14. The electric fan assembly of claim 13, wherein the fan further defines a maximum fan tip speed, and wherein the maximum fan tip speed is between about 200 feet per second and about 1,350 feet per second.

15. The electric fan assembly of claim 13, wherein the ratio of the hub radius to the fan radius is between about 0.25 and about 0.3.

16. A method for operating a propulsion system for an aircraft, the propulsion system comprising a fan having a plurality of fan blades and an electric motor mechanically coupled to the fan, the method comprising:

driving the fan using the electric motor, wherein the relationship between a fan pressure ratio, FPR, of the fan, wherein the FPR is a ratio of a discharge pressure of a fan to an inlet pressure of the fan, a number of the poles, maximum power, P, of the electric motor is defined by an equation:

$$\frac{n_{pole}}{\sqrt{P}} = C_1 \cdot e^{-9.062 \cdot FPR} + C_2 \cdot e^{-1.2604 \cdot FPR},$$

wherein $C_1$ is a constant having a value between 22,000 and 52,000, wherein $C_2$ is a constant having a value between 4.0 and 9.8, and wherein e is Euler's number.

17. The method of claim 16, wherein driving the fan using the electric motor comprises operating the electric motor at a maximum pole passing frequency between about 1,500 Hertz ("Hz") and about 3,500 Hz.

18. The method of claim 16, wherein driving the fan using the electric motor comprises rotating the fan at a rotational speed equal to a rotational speed of a rotor of the electric motor.

19. The method of claim 16, wherein the propulsion system further comprises a combustion engine, an electric generator mechanically coupled to the combustion engine, and a power bus electrically connecting the electric generator to the electric motor, and wherein the method further comprises:

generating electrical power with the electric generator; and providing the electrical power generated to the electric motor through the power bus.

20. The method of claim 19, wherein providing the electrical power generated to the electric motor through the power bus comprises passing the electrical power through power electronics operating at a switching frequency between about 5 kilohertz (kHz) and about 30 kHz.

* * * * *